US005943751A

United States Patent [19]

Kamei

[11] Patent Number: 5,943,751

[45] Date of Patent: Aug. 31, 1999

[54] WIRE END ALIGNMENT ASSEMBLY FOR WIRE CRIMPING APPARATUS

[75] Inventor: Kazuaki Kamei, Yamato, Japan

[73] Assignee: Molex Incorporated, Lisle, Ill.

[21] Appl. No.: 08/869,435

[22] Filed: Jun. 5, 1997

[30] Foreign Application Priority Data

Jun. 14, 1996 [JP] Japan .................................... 8-175569

[51] Int. Cl.[6] ............................. B23P 19/00; H01R 43/00

[52] U.S. Cl. .............................. 29/33 M; 29/749; 29/755

[58] Field of Search ................................ 29/564.4, 564.6, 29/33 M, 749, 748, 755, 705; 140/92.1, 93 R, 105

[56] References Cited

U.S. PATENT DOCUMENTS 4,136,440 1/1979 Brandewie et al. ............... 29/564.4 X
4,404,743 9/1983 Brandewie et al. .................. 29/749 X
4,439,919 4/1984 Cheh et al. ............................... 29/748
5,127,151 7/1992 Weigert et al. ....................... 29/755 X
5,343,617 9/1994 Tanaka ...................................... 29/705
5,509,195 4/1996 Watanabe ........................... 29/33 M X

FOREIGN PATENT DOCUMENTS 37202 10/1981 European Pat. Off. .............. 29/564.4

*Primary Examiner*—William Briggs
*Attorney, Agent, or Firm*—Charles S. Cohen

[57] ABSTRACT

An improved wire harness-making apparatus includes a wire supply in the form of a plurality of wire reels, a wire measuring and feeding unit, connector terminating units, a wire pulling unit, and a wire holding and shifting unit. The wire pulling unit includes a reciprocatable harness wire guide member a plurality of guides that receive therein harness wires fed as a set wire measuring and feeding unit, and a gripping unit for holding the leading ends of the harness wires in place at the entrances of the wire guides. The guide member has a predetermined length corresponding to a desired length of wire, and the gripping unit is disposed proximate to the front end of the guide member. In operation, each wire is fed from the wire measuring and feeding unit into a corresponding wire-receiving guide of the guide member when the front end of the guide member is moved toward and near to the wire measuring and feeding unit. The guide member is then withdrawn until the leading end of each harness wire is disposed close to the front end of the guide member. The leading ends of the harness wires are then caught by the wire gripping unit which permits pulling out of harness wires.

18 Claims, 7 Drawing Sheets

WIRE END ALIGNMENT ASSEMBLY FOR WIRE CRIMPING APPARATUS

BACKGROUND OF THE INVENTION

The present invention generally relates to a wire feed assembly for use in a wire terminating apparatus for making electric harnesses, and more particularly to wire feed mechanisms that simultaneously effect the feeding of harness wires and align their leading ends of the harness wires during assembly of the harnesses.

Certain apparatus for making wire harnesses are known in the art for producing wire harnesses having a plurality of wires of a given constant length with electrical connectors terminated to opposing ends of the harness wires, typically by crimping. Such apparatus includes a multiple wire supply in the form of a series of wire reels with each wire reel having a selected amount of wire wound thereon; a wire measuring and feeding unit for uncurling a predetermined length of wire from each wire reel; two connector terminating assemblies for terminating electrical connectors to the opposing ends of the wires fed from the wire measuring and feeding unit, and a wire holding-and-shifting unit for carrying the predetermined length of wires to the connector terminating assemblies.

Specifically, such apparatus further includes a wire-pulling device as part of the wire measuring and feeding unit for pulling a predetermined length of the harness wires. The wire-pulling device typically comprises a means for pinching the leading ends of the electric wires fed by the wire measuring and feeding unit and a means for moving the wire-pinching means forward and backward. In operation, the wire-pinching means moves forward to pinch the leading ends of the wires fed from the wire measuring and feeding unit and then it moves backward with pinched wires to pay out the predetermined length of harness wires. The length of harness wires fed from the wire measuring and feeding unit is then determined in terms of the distance between the forward and backward movements of the wire-pinching means.

As one may expect, this prior art wire-pulling device requires that the rate at which wires are fed out by the wire measuring and feeding unit be equal to the rate at which the wires are pulled out by the wire-pulling device. Otherwise, electric wires would loosely sag or otherwise be broken. It is difficult to synchronize the wire measuring and feeding unit with the wire-pulling and it cannot be effected quickly, thus preventing wires from being pulled out at an increased rate. This disadvantageously decreases the efficiency with which wire harnesses may be made.

The lateral spacing of the harness wires, i.e., the wire-to-wire interval, must be adjusted to meet the particular connectors used to terminate the harness wires at the wire end. In some instances, as shown in FIG. 12 hereof, the diverging ends $L_1$ of the wires 1 appear on the downstream side of the wire measuring and feeding unit, as indicated at C. After cutting the wires to provide harness wires of a desired length, these diverging wire ends sections are put in initial linear position as shown in FIG. 13. As seen from FIG. 13, the outermost wires have a longer end lengths $L_2$ and the wire end lengths decrease inwardly to $L_1$. This wire end irregularity deleteriously affects termination of connectors to the wires and thereby prevents the harness assembly from promptly continuing in the wire harness workpath unless the ends of the wires are cut to regular lengths. If the length of the cut wires is not substantially uniform some of the shortened wires of the wire harness (i.e., the inner ones as shown in FIG. 12) would fail to be caught by an associated connector during assembly of the harness.

The present invention provides a means to overcome this disadvantage and thereby increase the efficiency of manufacture.

SUMMARY OF THE INVENTION

One object of the present invention is to provide a harness making apparatus which substantially reduces the time it takes to pull out harness wires of predetermined lengths, and for removing irregularities from the cut ends of the electric wires.

To attain this object and other objects, an apparatus for making wire harnesses in which each wire harness includes a plurality of wires of a given constant length and two electric connectors terminated to the opposite ends of the wires, comprises: a multiple wire supply in the form of a plurality of wire reels, each wire reel having a selected amount of wire wound therearound; a wire measuring and feeding unit for feeding predetermined lengths of wire from the wire reels; connector termination means for terminating connectors to the opposing ends of the harness wires fed from the wire measuring and feeding unit; a wire-pulling unit for pulling predetermined lengths of harness wires from the wire measuring and feeding unit; and, a wire holding-and-shifting unit for carrying the predetermined lengths of harness wires measured by the wire measuring and feeding unit to the connector termination means.

This apparatus is improved according to the present invention in that the wire-pulling unit includes a wire guide means in the form of a wire template member having a corresponding plurality of wire guides disposed thereon. Each guide respectively receives a single wire fed from the wire measuring and feeding unit. The apparatus also includes a wire end engagement means for catching and holding each leading free end of the harness wires near the entrance of the respective associated wire guide, with the template member being of a length corresponding to a desired length of electric wire to be pulled out. With this arrangement, each of the harness wires may be fed from the wire measuring and feeding unit so it travels into a corresponding guide of the template member when the front end of the guide template is placed in proximity to the wire measuring and feeding unit.

After each harness wire extends into the template member, the template member is withdrawn for a predetermined distance until the free leading end of each wire is in close proximity to the inlet of its guide in the template member, whereupon the leading end of each wire is engaged by a wire engagement means, thereby setting up the pulling-out of the wires for a predetermined length.

No synchronization is required between the wire pulling means and the wire measuring section of the conventional harness making apparatus. Thus, the electric wires can be pulled out quickly, and accordingly electric harnesses can be made at an increased efficiency.

Each guide of the apparatus may further have an alignment means associated therewith in the form of a thrust pin for aligning the free leading end of the wire transversely with the other harness wires. The thrust pins contact the free leading ends of the wires when the wire free ends are caught and held by the wire engagement means so that the leading ends of the harness wires may be pulled out a predetermined length. This alignment has the effect of reducing the likelihood of manufacturing defective wire harnesses wherein some of the wires may fail to be engaged by associated connectors when terminated to the ends of the electric wires.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which.

DETAILED DESCRIPTION OF PREFERRED EMBODIMENTS

Figure 1:
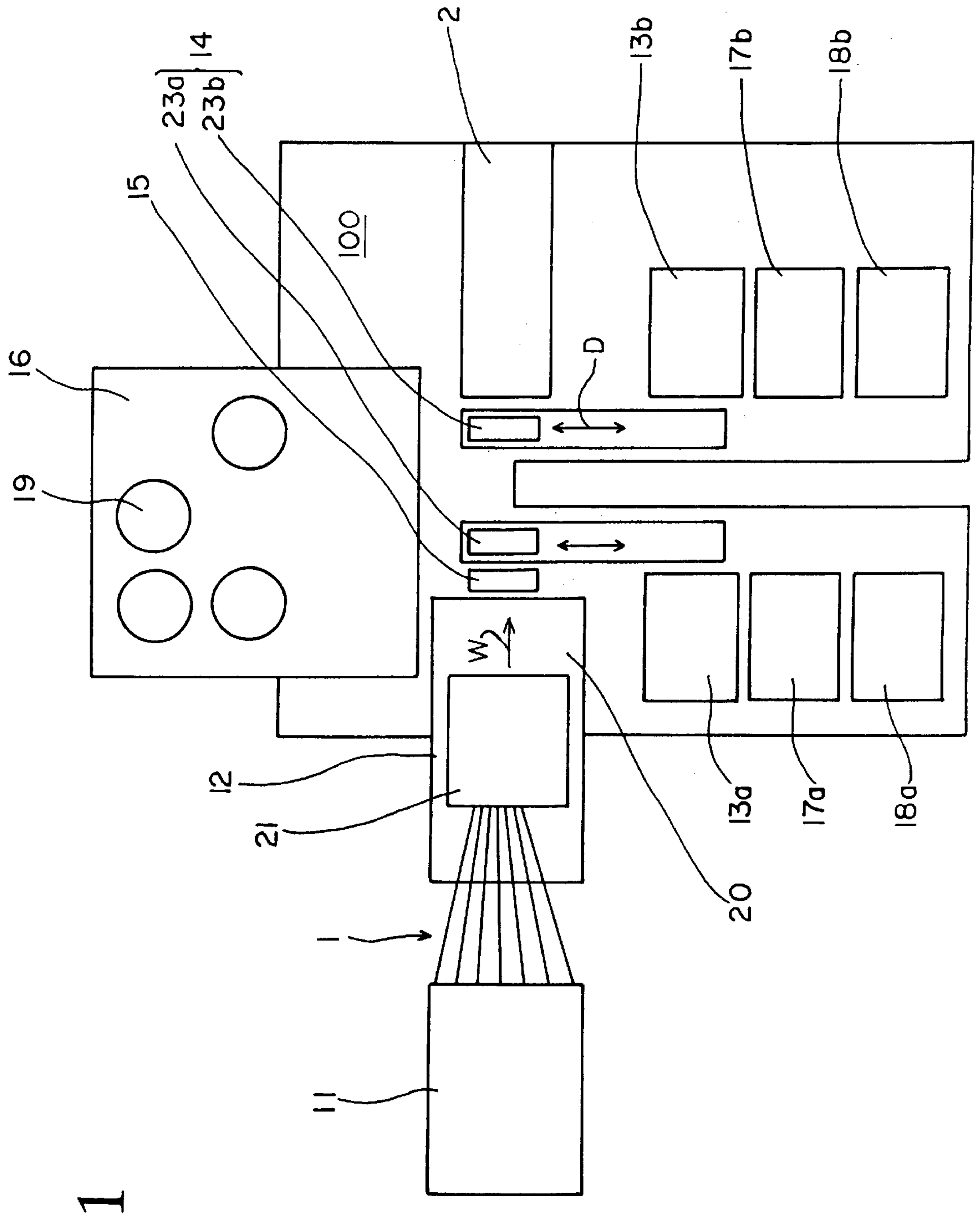
FIG. 1 is a plan view of a wire harness-making apparatus incorporating a wire alignment assembly constructed in accordance with the principles of the present invention.

FIG. 1, illustrates, in plan view an apparatus 100 constructed in accordance with the principle of the present invention for making wire harnesses. Each of the wire harnesses made includes a plurality of wires 1 of a given constant length and two electrical connectors 9*a*, 9*b* that are terminated to the opposite ends of the wires, such as by crimping. The apparatus 100 has a wire supply that includes a plurality of wire reels 11 each having a measure of wire 1 wound therearound. A wire measuring and feeding unit 12 that feeds and measures the length of the wire 1 coming off of each selected wire reel 11 lies adjacent to the wire supply 11 and is aligned therewith along a wire feedpath W. Two connector terminating units 13*a*, 13*b* for applying a pair of electric connectors 9*a* and 9*b* to the opposing ends 8, 10 of the wires 1 fed from the wire measuring and feeding unit 12 are located adjacent the wire feedpath W, but offset from the wire feed path at an angle, shown in FIG. 1 as generally a 900 angle. Two testing units 17*a* and 17*b* are disposed adjacent to and downstream of the connector terminating units 13*a* and 13*b* for testing and verifying the integrity of the wire harnesses and conductivity, termination and other aspects. Lastly, wire harness elimination units 18*a* and 18*b* are disposed downstream of the testing units 17*a*, 17*b* for removing defective harnesses.

Figure 12:
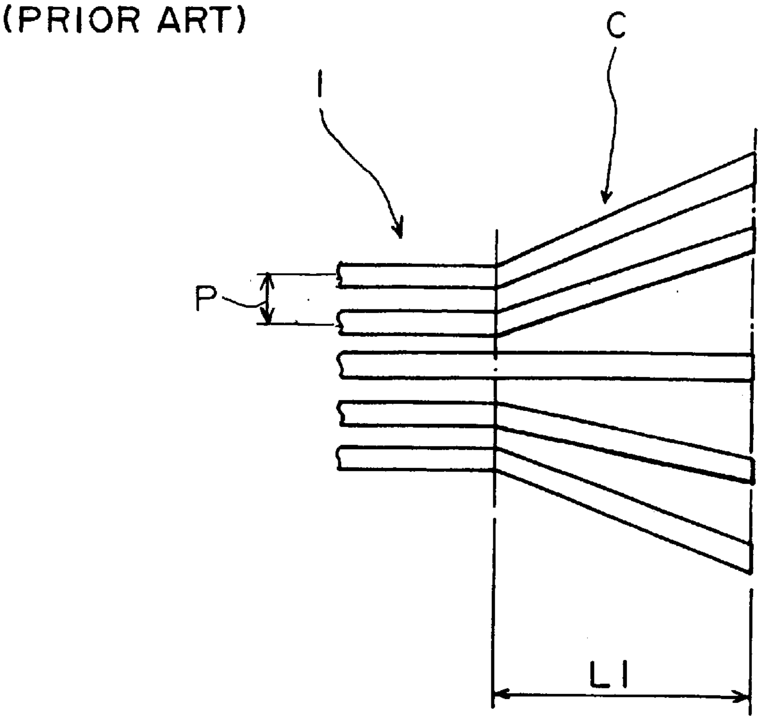
FIG. 12 (PRIOR ART)
FIG. 12 is an enlarged plan view of one end of a set of harness wires illustrating the lateral wire spacing displayed in a conventional harness-making apparatus prior to cutting the harness wires; and, FIG. 13 is the same view as FIG. 12, but illustrating the lateral wire spacing of the ends of the harness wires after cutting the harness wires.
Figure 13:
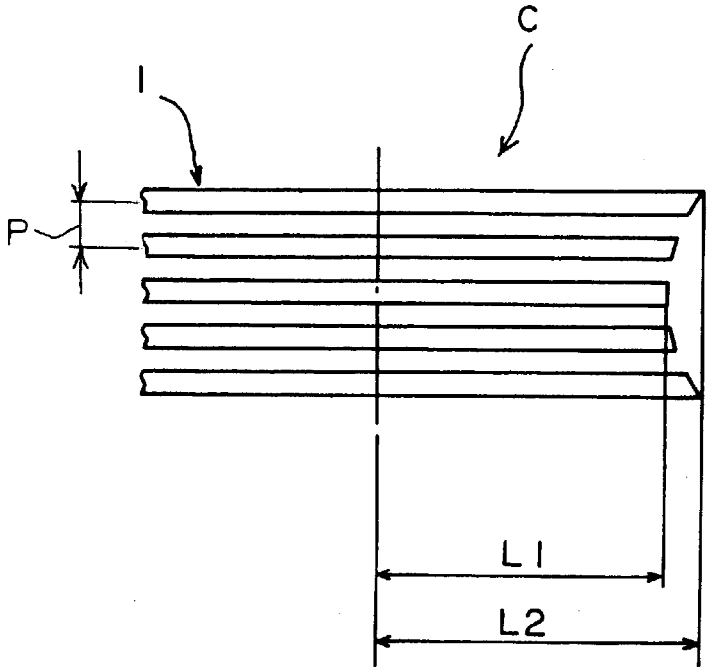
FIG. 13 (PRIOR ART)

The wire measuring and feeding unit 12 includes a wire feeding mechanism 21 that uses a suitable wire feed means, such as a servomotor, for feeding the harness wires 1 as well as for controlling the rate at which the wires 1 are fed for any given wire harness made by the apparatus 100. A wire-to-wire interval setting unit 20 that includes a pitch changer 35 actuated by suitable means, such as an associated piston and cylinder 36, is preferably provided as part of the wire measuring and feeding unit 12 to set and change, if necessary, the lateral spacing or pitch P (FIGS. 11–13), between adjacent wires 1 fed by the wire measuring and feeding unit 12. A wire cutting unit 15 that comprises upper and lower blades 26*a*, 26*b* driven by means such as associated piston and cylinders 27*a*, 27*b* is also provided.

The harness making apparatus additionally includes a wire clamping and shifting unit 14 and a connector element supply 16, including connector element feeders 19 for supplying, in serial order individual electrical connectors to the connector terminating units 13*a*, 13*b*. The wire clamping and shifting unit 14 may comprise a pair of clamping elements 23*a*, 23*b*, each of which may further comprise upper and lower clamping assemblies 24*a* and 24*b* for holding and carrying a bundle of measured electric wires from the wire measuring and feeding unit 12 to the connector terminating means 13*a* and 13*b* in the direction indicated by D. The clamping assemblies 24*a*, 24*b* are driven by suitable means, such as associated respective powered cylinders 25*a*, 25*b*.

The present invention relates particularly to an improvement of the apparatus 100 and particularly, a mechanism for pulling out a predetermined length of the harness wires 1 from the wire measuring and feeding unit 12, to thereby provide a set of wires of desired length, the opposing ends of which are secured to respective connector elements 9*a*, 9*b* by the connector terminating means 13*a* and 13*b* for making wire harnesses.

Figure 2:
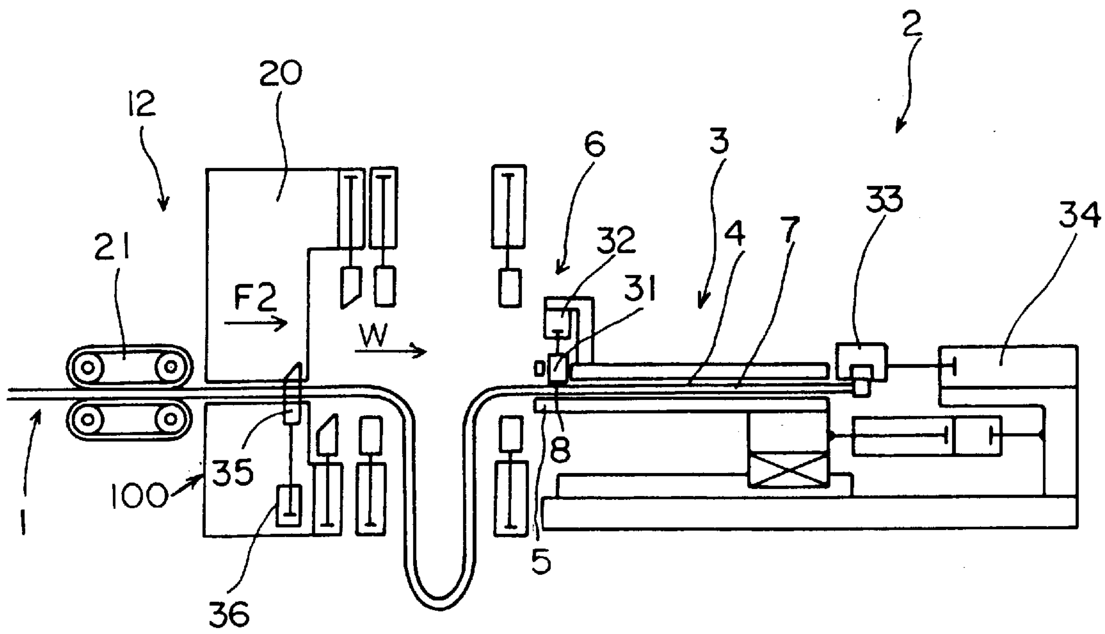
FIG. 2 is an elevational diagrammatic view of the wire harness-making apparatus of FIG. 1, illustrating the components thereof and the harness-making apparatus in a initial position.
Figure 11:
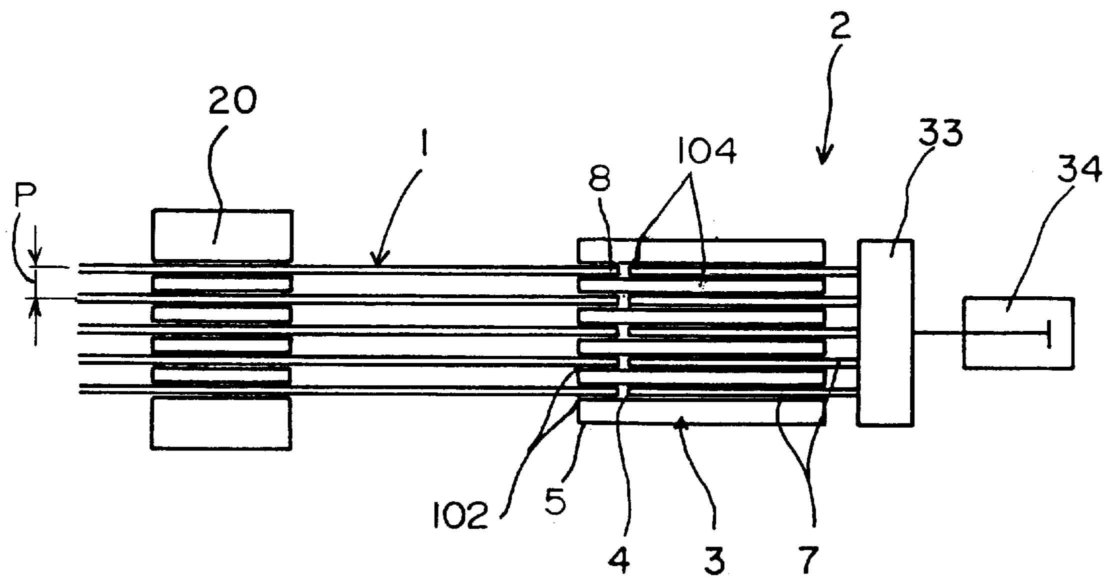
FIG. 11 is an enlarged detail plan view of the harness wire end alignment assembly of FIG. 5, taken generally along lines 11—11 in FIG. 5.

As seen from FIG. 2, the wire pulling unit 2 comprises a slidable form or wire template member 3 that incorporates, as shown best in FIG. 11, a corresponding plurality of guides 4 that respectively receive the wires 1 fed from the wire measuring and feeding unit 12, and a wire engaging means 6 for catching and holding the leading end of each of the harness wires 1 near the entrances 102 of each of the template member wire guides 4. The template member 3 is of a predetermined length that is equal to a desired length of wire to be pulled from the wire supply reels 11 and the guides 4 thereof may take any desired form so long as they contain the wires 1 therein, such as hollow channels 104. The template member 3 is mounted on a linear guide bearing assembly 28, which is driven back and forth in its reciprocating movement by an associated drive means, such as a primary piston and cylinder assembly 29 and a secondary piston and cylinder assembly 30.

The wire engagement means 6 includes a harness wire set clamp 31 and a piston and cylinder drive assembly 32. The wire engagement means 6 is secured near the front end 5 of the template member 3 for catching and holding the leading ends 8 of the wires 1 in place near the front end 5 thereof.

The apparatus 100 includes a means for aligning the ends of the harness wires 1. This wire end alignment means includes, at each wire guide 4 of the template member 3, an alignment thrust pin 7 for aligning the leading free ends 8 of the wire 1 in a common, lateral alignment. The alignment thrust pins 7 are fixed to an associated pin support 33, that is driven by a suitable drive means, such as an associated piston-and-cylinder drive 34.

Figure 3:
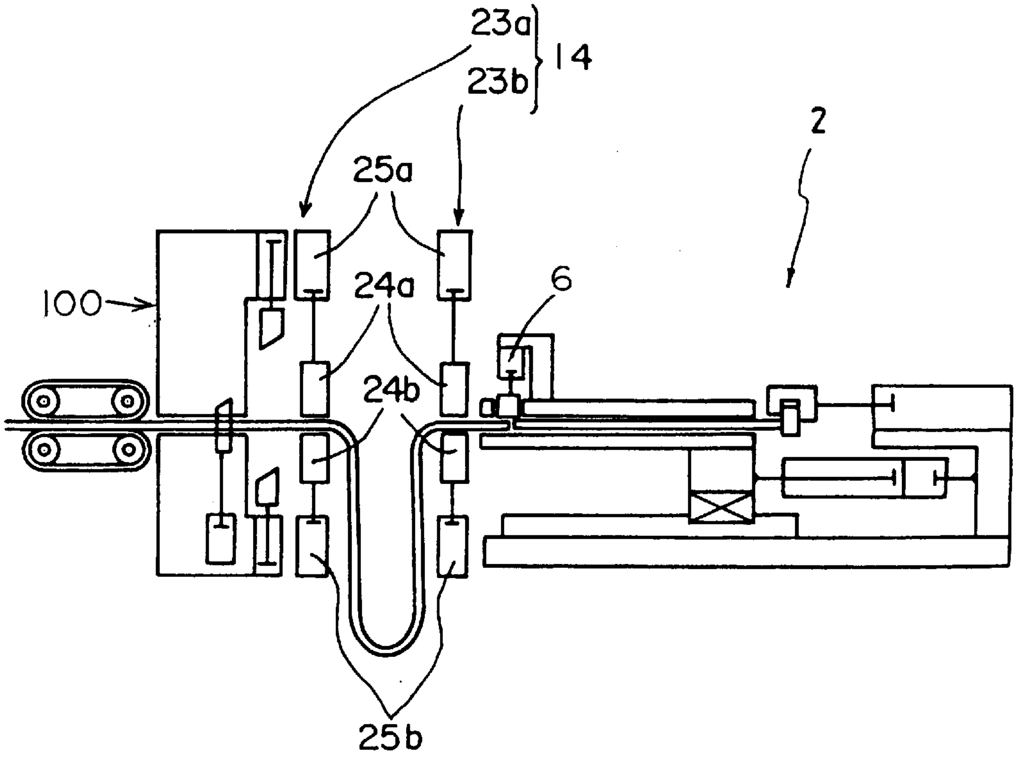
FIG. 3 is the same view as FIG. 2, illustrating a first movement of the wire harness-making apparatus.

Now, the manner in which the wire pulling unit 2 of the harness-making apparatus 100 will now be described. As the first step, the primary and secondary piston and cylinder assemblies 29 and 30 are actuated, thereby causing the template member 3 to move forward from the initial position of FIG. 2 to the subsequent position of FIG. 3, where the front end 5 of the template member 3 is now in close proximity to the leading ends 8 of the wires 1 ready to be fed from the wire measuring and feeding unit 12. Preferably at this movement, the forward ends of the wire alignment thrust pins 7 remain within the guides 4 of the template member 3 near the rear of the template member 3 as illustrated in FIG. 3.

Figure 4:
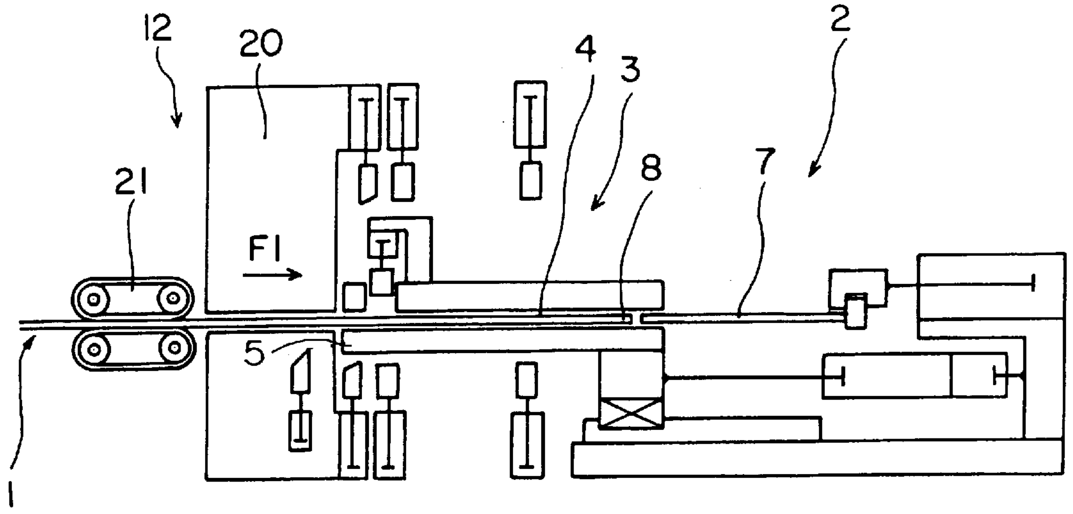
FIG. 4 is the same view as FIG. 2, but illustrating a second subsequent movement of the wire harness-making apparatus.

At the second step as illustrated in FIG. 4, the wire feeding mechanism 21 and the wire measuring and feeding unit 12 is actuated to thereby feed the harness wires 1 into the guides 4 of the template member 3. This wire feeding continues until the leading ends of the wires 1 make contact with the thrust pins 7 and abut thereagainst. At this position a first predetermined length F1 for each of the harness wires extending in the guide pieces 4 of the guide template 3 is determined, as seen in FIG. 4.

Figure 5:
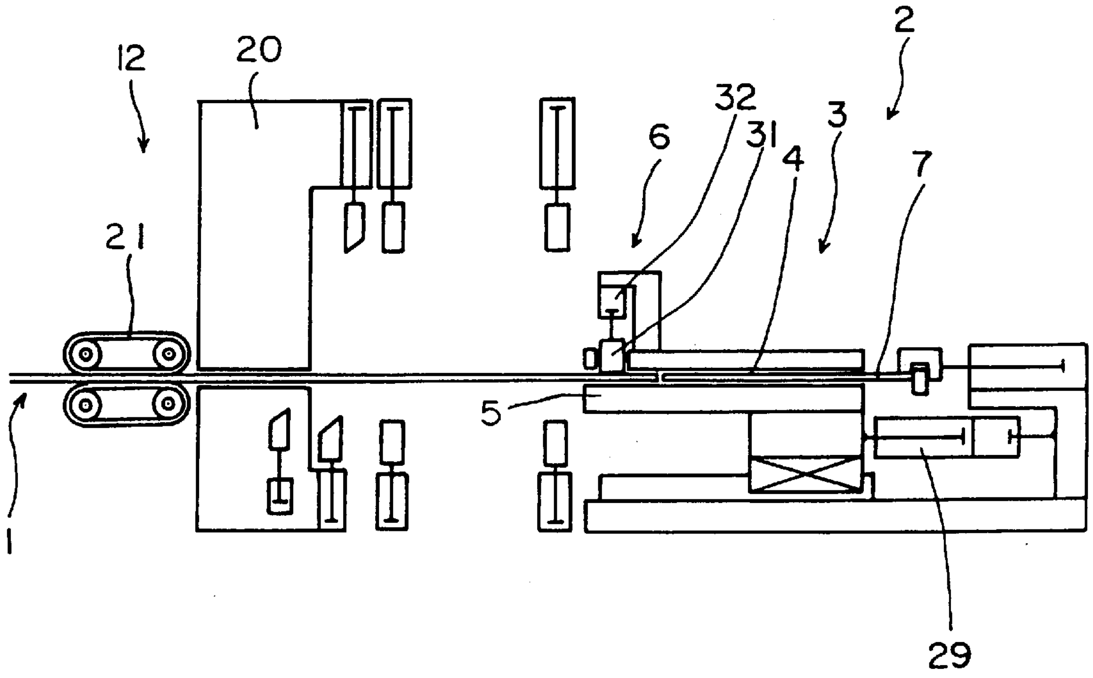
FIG. 5 is the same view as FIG. 2, but illustrating a third subsequent movement of the wire harness-making apparatus.

Subsequent to the second step and as a third operative step, as illustrated in FIG. 5, the primary piston and cylinder assembly 29 is actuated to partially withdraw the template member 3. The piston and cylinder assembly 32 is actuated to bring the harness wire set clamp 31 into contact with the harness wire set 1 to hold the leading free ends 8 thereof in position. As the template member 5 moves rearwardly, the wire pulling unit 2 in effect draws out a length of the wire set that is approximately equal to the length of the template member.

Figure 6:
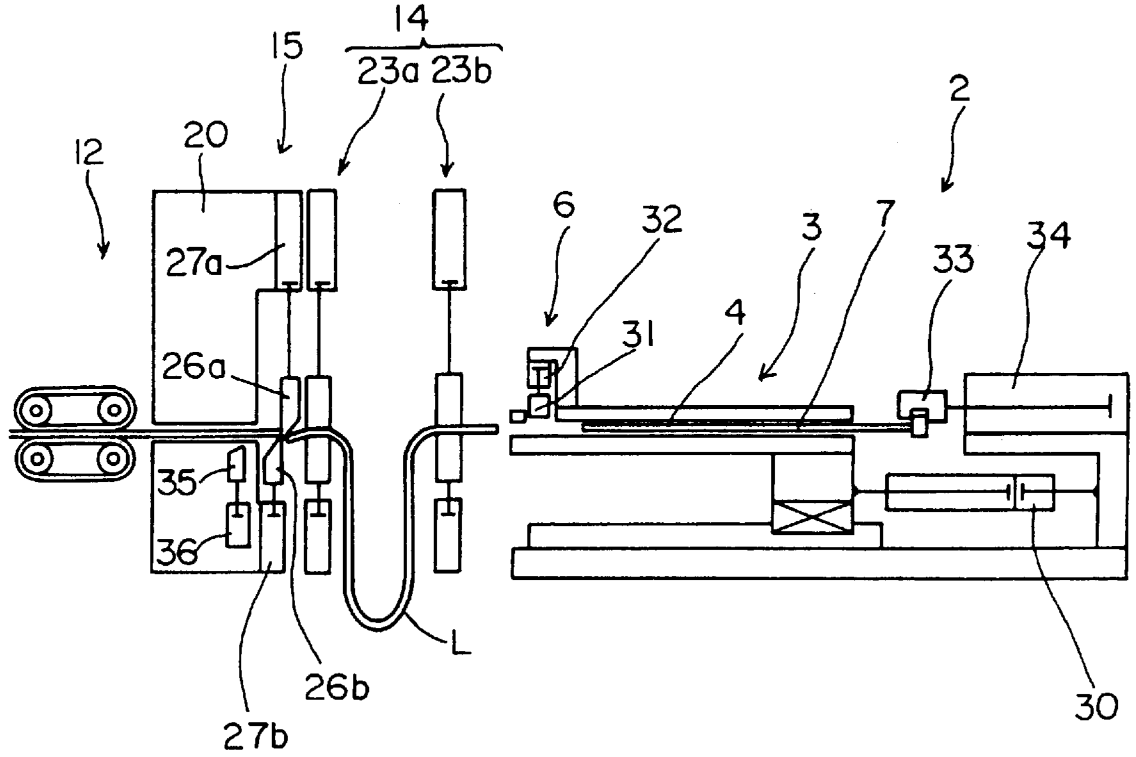
FIG. 6 is an elevational diagrammatic view of the wire harness-making apparatus of FIG. 2, but illustrating a fourth subsequent movement, and a looping of the harness wires advanced by the wire feed assembly of the harness-making apparatus.
Figure 7:
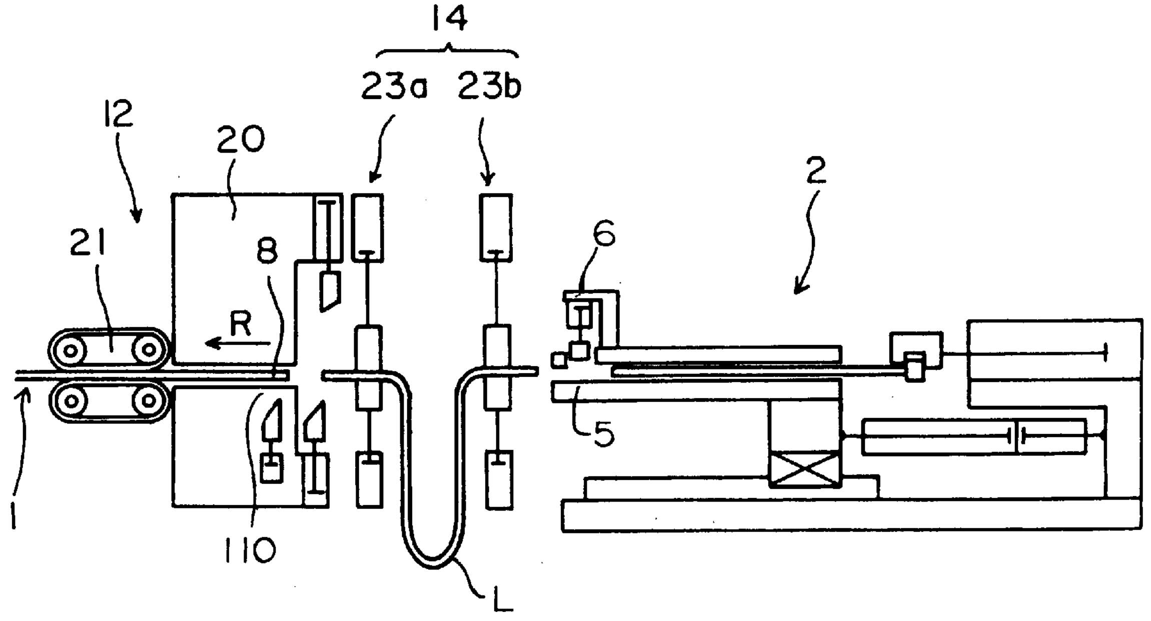
FIG. 7 is an elevational diagrammatic view of the wire harness making apparatus of FIG. 2 illustrating a subsequent movement of the wire harness-making apparatus wherein the harness wires are clamped to define the length of the wire harness.

Subsequent to the third step, the lateral alignment of the leading ends 8 of the wires 1 and the feeding-out of the electric wires 1 from the wire measuring and feeding unit 12 occurs as illustrated in FIG. 6. Specifically at this fourth step, the lateral aligning of the leading ends 8 of the electric wires 1 is effected by actuating the piston and cylinder drive assembly 34, to thereby drive the alignment thrust pins 7 through the wire guides 4 of the template member 3 into contact with the wires 1. On the other hand, the feeding out of the wires occurs in the direction of arrow F2 to complete the length of the wire harness required. This feeding occurs by the wire feed mechanism 21.

At the same time, if necessary, the wire-to-wire interval setting unit 20 may be actuated by its associated piston-and-cylinder drive assembly 36 to place the harness wires 1 in predetermined intervals or pitches P as is required for the wire harnesses to be made. In order to effectuate this feeding step, a loop L may be formed in the harness wires 1 as illustrated in FIG. 6.

After feeding out the electric wires 1 over the required length in the direction of F2, the cylinder assemblies 25*a*, 25*b* are actuated to drive the upper and lower clamps 24*a*, 24*b* into engagement with the harness wires 1 to catch and hold the set of measured harness wires 1 as illustrated.

Figure 8:
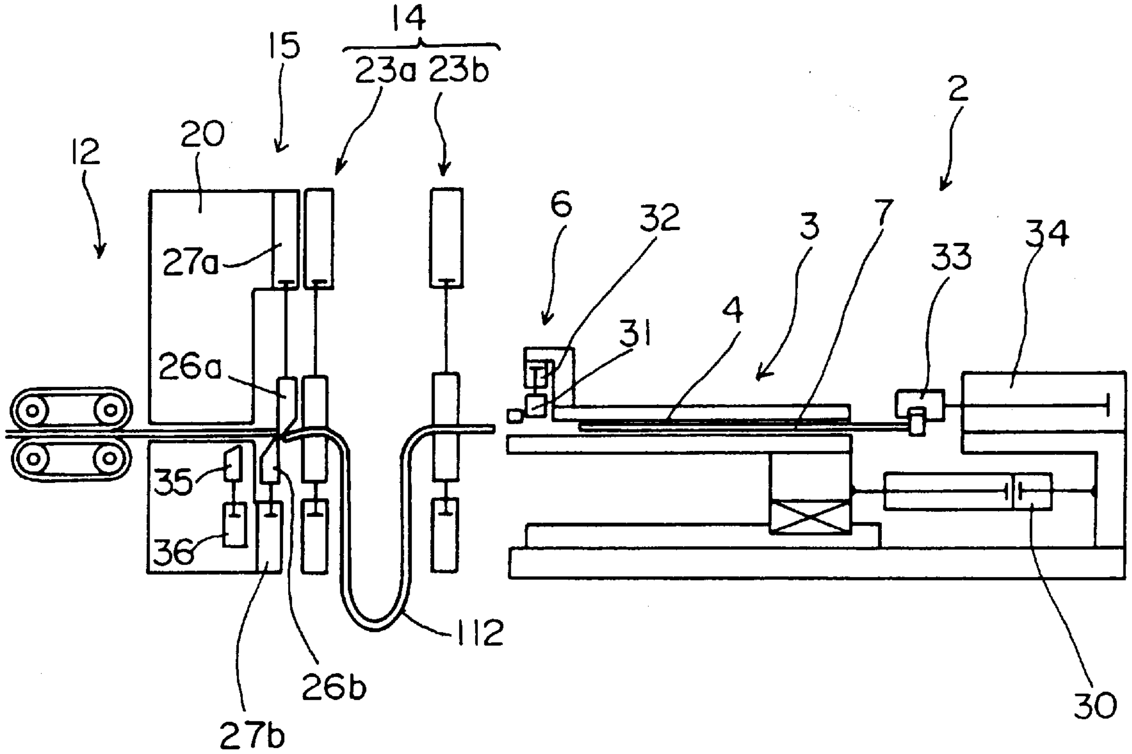
FIG. 8 is an elevational diagrammatic view of the wire harness making apparatus of FIG. 2 illustrating a subsequent movement of the wire harness-making apparatus wherein the opposite ends of the harness wires are cut.

After holding the measured wires 1 with the clamps 23*a*, 23*b* as a fifth step as illustrated in FIG. 8, two opposing blades 26*a* and 26*b* are actuated by their respective associated upper and lower piston and cylinder drive assemblies 27*a*, 27*b* and brought into contact with the measured harness wires 1 in order to cut them. At the same time, the harness wire set is then released from the wire engagement means 6. Then, the secondary piston and cylinder drive sub assembly 30 is actuated to withdraw the template member 3 from the leading ends of the wires 1. As a sixth step, the piston and cylinder drive assembly 36 is thereupon activated to withdraw the wire interval setting unit 20 from engagement with the harness wires 1, which now remain in their required intervals.

Figure 9:
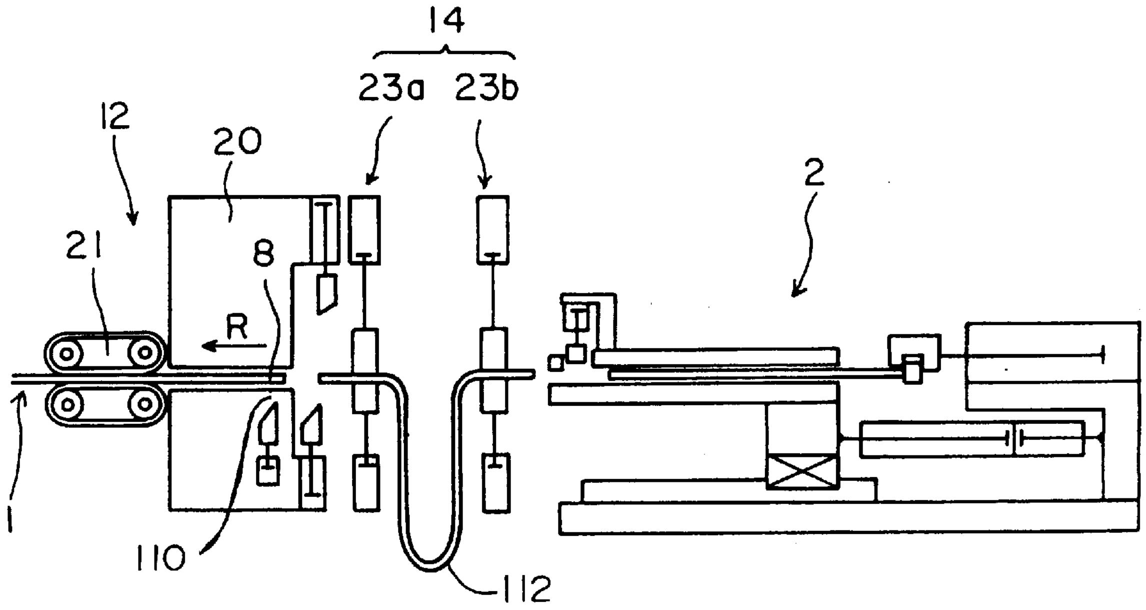
FIG. 9 is an elevational diagrammatic view of the wire harness making apparatus of FIG. 2 illustrating a subsequent movement of the wire harness-making apparatus wherein the free ends of the next set of harness wires are withdrawn into the wire measuring and feeding unit and the opposing, cut ends of the harness wires are moved to connector terminating means.

As the next step, the wire feeding mechanism 21 of the wire measuring and feeding unit 12 is actuated to withdraw the next set of leading ends of the wires 1 generally in the direction indicated by arrow R of FIG. 9 so that this next set of leading wire ends are positioned in the outlet 110 of the wire measuring and feeding unit 12. At the same time, the wire clamping and shifting unit 14 is actuated to bring the cut and measured harness wire set 112 downstream to the connector termination means 13*a* and 13*b* where connectors 9*a*, 9*b* are terminated thereto, such as by crimping, insulation displacement or other suitable termination process. Finally, all components are allowed to return to the initial position of the apparatus 100 as shown in FIG. 2.

Figure 10:
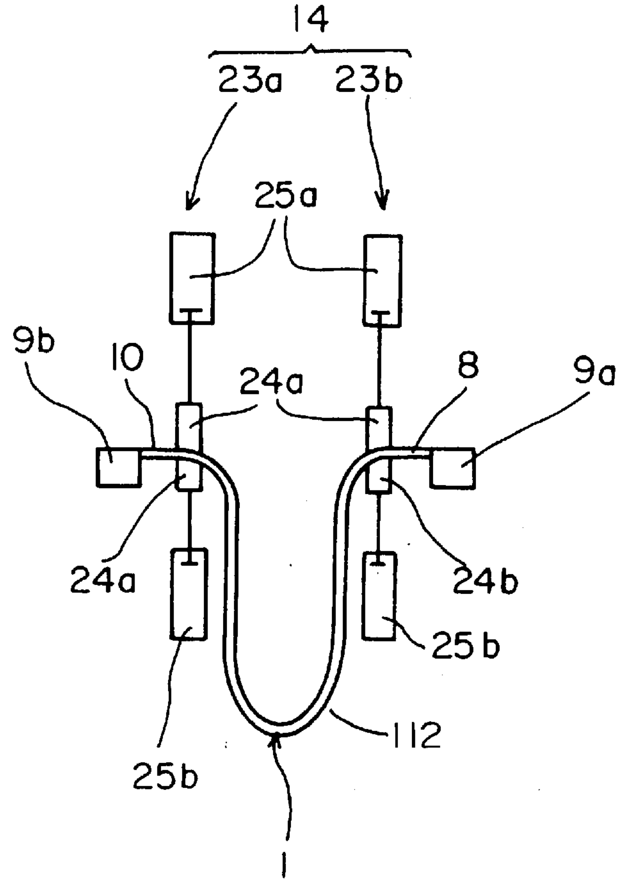
FIG. 10 is an enlarged detail elevational diagrammatic view of a section of the wire harness-making apparatus of FIG. 2, illustrating connector elements applied to the opposite ends of the harness wires.

The set 112 of cut harness wires 1 are brought to the connector termination units 13*a*,13*b*, at which electric connectors 9*a*, 9*b* are terminated to their opposing ends of the harness wires as illustrated FIG. 10. These completed wire harnesses are then passed through the testing units 17*a*, 17*b* for checking of the harnesses, and through the eliminators 18*a*, 18*b* for removing defective harnesses, if any. Finally, complete wire harnesses are provided.

As may be understood from the above, as the harness wires 1 are fed out from the wire measuring and feeding unit 12, the wires 1 will enter the guides 4 of the wire template member 3. This movement of the wires has the effect of pulling the wires from the wire measuring and feeding unit 12 for a first predetermined length while the leading ends of the wires 1 are aligned in both proper lateral spacing and alignment of the leading ends, thereby eliminating the necessity of further primping and pulling the leading ends 8 of the electric wires 1 to align them together as in the prior art.

While the preferred embodiment of the invention have been shown and described, it will be apparent to those skilled in the art that the embodiments are merely illustrative of some of applications of the principles of the present invention and that changes and modifications may be made therein without departing from the spirit of the invention, the scope of which is defined by the appended claims.

I claim:

1. An apparatus for making wire harnesses wherein each wire harness includes a plurality of wires of a predetermined length, the wires having sets of opposing ends, and two electrical connector elements terminated to said wires at said opposing ends, the wire harness-making apparatus comprising:

a multiple wire supply including a series of wire reels, each wire reel containing a preselected amount of wire; a wire measuring and feeding unit for feeding lengths of wires from said wire reels to define a set of harness wires and measuring the length of said harness wire set fed therefrom; a wire cutting unit for cutting said wires of said harness wire set; connector element terminating units for terminating connector elements to opposing ends of said harness wire set; a harness wire set pulling unit for pulling said harness wire set from said wire measuring and feeding unit; and, a harness wire set shifting unit for moving said harness wire set to the connector element terminating units, the harness wire set pulling unit including a movable wire template member having a plurality of wire-receiving guides disposed thereon from receiving free leading ends of said harness wire set extending from said wire measuring and feeding unit and maintaining said harness wire set free leading ends in a predetermined order, said harness wire set pulling unit further including means for gripping said harness wire set free leading ends in place within said wire template member, and;

said harness wire set pulling unit further including means for aligning said wire leading ends, the wire leading end alignment means including a plurality of alignment members extending longitudinally along said wire template member wire guides, said wire template member being at least movable with respect to said alignment members.

2. The wire harness making apparatus of claim 1, wherein said wire template member wire-receiving guides include a plurality of channels.

3. The wire harness making apparatus of claim 1, wherein said harness wire set pulling unit gripping means is disposed proximate to a leading edge of said wire template member.

4. An apparatus for making wire harness, wherein each wire harness includes a plurality of wires of predetermined length, the wires having sets of opposing wire ends, and at least two connector elements terminated to said wire at said opposing wire ends, and at least two connector elements terminated to said wire at said opposing wire ends, the apparatus comprising:

a wire supply;

a wire feeder for feeding lengths of wires from the wire supply to define a set of harness wires;

a cutter for cutting said wires of said harness wire set to define opposing wire ends of said harness wire sets;

a harness wire set shifter for holding said harness wire sets fed by said wire feeder and transferring said held harness wire sets to a termination location remote from said wire feeder;

connector element terminating assemblies for terminating connector elements to said opposing wire ends of said harness wire set;

the harness wire set shifter including a movable guide member having a plurality of wire-receiving guides disposed thereon for receiving free leading ends of said wires of said harness wire set and a wire alignment assembly;

the wire alignment assembly having a plurality of elongated wire alignment members that are aligned with and extend partially through said wire-receiving guides for contacting said free leading wire ends and alignment them laterally within said wire receiving guides; and, a wire gripper for gripping said harness wire set free leading ends received by said harness wire set shifter.

5. The wire harness making apparatus of claims 1, wherein said wire template member wire guides include a plurality of channels, and wherein individual alignment members are disposed respectively within individual channels.

6. The wire harness making apparatus of claim 1, wherein said alignment members include a plurality of thrust pins operatively associated with said wire pulling unit, said thrust pins being disposed within said wire template member wire guides and movable within said wire template member wire guides into and out of abutting contact with said harness wire free leading ends.

7. The wire harness making apparatus of claim 1, wherein said wire template member is aligned with said wire measuring and feeding unit and is further slidable along a wire feed path into and out of proximity to an exit opening of said wire measuring and feeding unit.

8. The wire harness making apparatus of claim 1, wherein said harness wire set leading ends gripping means is disposed in proximity to an entrance of said wire template member and is further interposed between said wire measuring and feeding unit and said connector element terminating units.

9. The wire harness making apparatus of claim 1, wherein said harness wire set shifting unit further includes means for clamping said harness wire set after said harness wire set free leading ends are aligned at said wire pulling unit, said harness wire set shifting unit being moveable along a work path that is angularly disposed with respect to said wire feed path.

10. An apparatus for making wire harnesses, each wire harness including a set of conductive harness wires of a given constant length, each of the harness wire set having respective leading and trailing ends that are terminated to respective first and second electrical connector elements at opposite ends of wire harnesses, the harness-making apparatus comprising:

a multiple wire supply;

means for feeding said harness wire sets from said wire supply;

means for measuring lengths of said harness wire sets fed by said wire feeding means;

means for cutting said harness wire sets to define said leading and trailing ends of said harness wire sets;

means for holding said harness wire sets fed by the wire feeding means and transferring said held harness wire sets to a termination location remote from said wire feeding means;

means for respectively terminating said first and second connector elements to said leading and trailing ends of said harness wire sets; and, means for aligning said leading ends of said harness wire sets, the harness wire set leading end alignment means including a movable wire guide member aligned with said wire feeding means, the wire guide member including a plurality of wire-receiving tracks that receive individual wires of said harness wire sets therein, said wire guide member further including a plurality of individual wire alignment members that are extendable through portions of said wire guide members for laterally contacting and aligning said wire leading ends in place within said wire guide member when said wire guide member is moved away from said wire feeding means, and means for gripping the laterally aligned wire leading ends and holding them in place while feeding lengths of wire from said wire supply.

11. The wire harness making apparatus of claim 10, wherein said wire guide member tracks include elongated channels that extend lengthwise along said wire guide member.

12. The wire harness making apparatus of claim 11, wherein said wire guide member is at least partially movable relative to said individual alignment members and said individual wire alignment members extend through portions of said wire guide channels.

13. The wire harness making apparatus of claim 10, wherein said wire guide member is reciprocatable along a first workpath of said apparatus and said harness wire set transfer means is moveable along a second workpath of said apparatus, said first and second work paths intersecting each other.

14. The wire harness making apparatus of claim 10, wherein said wire leading end gripping means is disposed in proximity to an entrance of said wire guide member and interposed on said apparatus between said wire feeding means and said wire leading end aligning means.

15. The wire harness making apparatus of claim 13, wherein said wire leading end aligning means includes a plurality of individual wire alignment members in the form of thrust pins that extend longitudinally along said wire guide member, said thrust pins having contact edges that abuttingly contact said wire leading ends during movement of said wire guide member to thereby laterally align said wire leading ends for said wire leading end gripping means.

16. The wire harness making apparatus of claim 10, wherein said wire leading end gripping means is fixed to said wire guide member and moves in concert with said wire guide member such that movement of said wire guide member establishes a first length of each of said harness wire sets and subsequent feeding of said wire by said wire feeding means establishes a second, additional length of each of said harness wire sets.

17. The apparatus of claims 4, wherein said wire alignment members include a plurality of thrust pins that are movable into and out of contact with said harness wire set free leading ends.

18. The apparatus of claim 4, wherein said harness wire shifter is movable lengthwise relative to said wire alignment members.

* * * * *